Patented Dec. 13, 1932

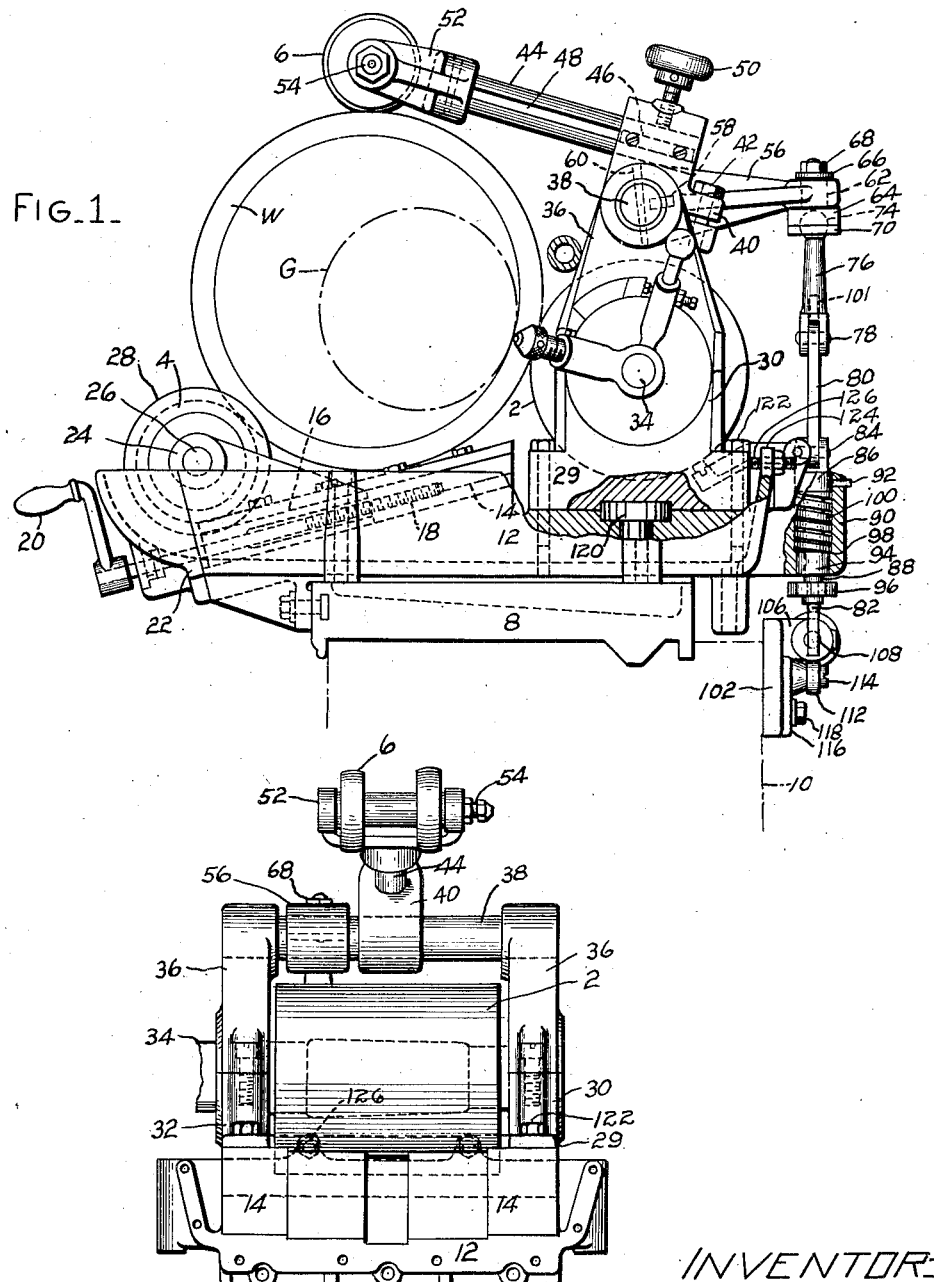

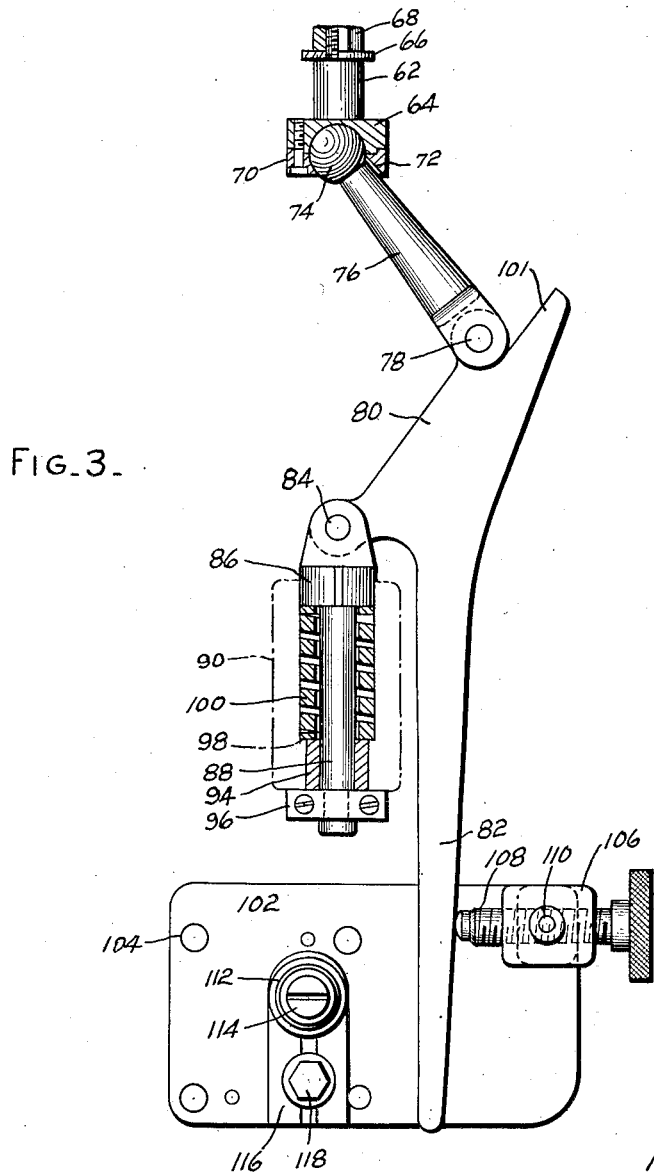

1,890,854

UNITED STATES PATENT OFFICE

PHILIP H. HUTCHINSON, OF MONTCLAIR, NEW JERSEY, ASSIGNOR TO GENERAL MOTORS CORPORATION, OF DETROIT, MICHIGAN, A CORPORATION OF DELAWARE

GRINDING MACHINE

Application filed March 16, 1931. Serial No. 522,843.

This invention relates to grinding machines and comprises all of the features of novelty herein disclosed, by way of example, in connection with a chuckless machine for internal grinding.

An object of the invention is to provide an improved apparatus for oscillating a work holding element of a work head to facilitate the insertion and removal of work. Another object is to provide automatic apparatus for lifting and lowering the pressure idler wheel of a chuckless grinder without producing any substantial or undue tendency to tilt the sliding carriage on its ways. Another object is to provide apparatus for facilitating the lining up of the wheel axes of a chuckless grinder.

To these ends and also to improve generally upon machines of this character, the invention consists in the various matters hereinafter described and claimed. In its broader aspects, the invention is not necessarily limited to the specific construction selected for illustrative purposes in the accompanying drawings in which Fig. 1 is a side view of the work head with some parts broken away and in section.

Fig. 2 is a front view of the work head with the supporting idler wheel and its slide removed.

Fig. 3 is a rear view of the toggle mechanism to a large scale with some parts in section.

A work-piece W, such as a sleeve or ring to be internally machined or ground, is rotatably supported between a backing wheel 2, a supporting idler wheel 4, and a pressure applying idler wheel 6, all the wheels turning on axes that are precisely parallel to one another when the work-piece is a straight hollow cylinder with a straight cylindrical bore. A cutting tool, such as a grinding wheel G, engages the bore of the work-piece at a line which is preferably directly opposite to the line of contact between the outer periphery of the work-piece and the periphery of the backing wheel. One or more of the wheels on the work-head is driven at a speed usual to that of a chuck and preferably the backing wheel 2 is driven in which case it also controls the speed of rotation of the work.

When straight hollow cylinders are being machined internally to have uniform wall thickness, the axis of the grinding wheel is preferably maintained parallel to the axes of the other wheels but is fed in an inclined plane including both the axis of the grinding wheel G and the line of contact of the backing wheel with the work. Wheel 2 can however be slightly skewed if desired to produce a work-feeding tendency. Either the tool or the work is preferably given an axial reciprocation and, in the illustrated construction, the work head is mounted on a sliding carriage or table 8 moving on ways of a base or frame 10 which supports the grinding wheel in any suitable way for cross feeding movement towards the backing wheel. The grinding wheel preferably rotates downwardly at the work but the backing wheel can be rotated in either direction with almost equally good results. The supporting wheel 4 is lower than the other wheels and located at the front to facilitate insertion of the work-piece rearwardly over it, the piece being loaded by a radial movement transverse to the direction of table reciprocation, the wheel 6 then being swung backwardly.

The work head includes a casting 12 bolted to the table and forming a pan underlying the wheels to collect cooling fluid. Inclined ways 14 support a slide 16 which is adjustable by a screw 18 having an operating handle 20. The screw has an unthreaded portion journalled in a plate 22 which forms the front wall of the pan or casting 12. The slide has a pair of standards 24 supporting a shaft 26 around which the wheel 4 is free to rotate, the wheel preferably having flanges 28 to keep the work from shifting axially.

The pan or casting 12 supports a swivelled base 29 having spaced standards 30 and 32 to journal a shaft 34 by which the backing wheel 2 is rotatably supported and driven. Extensions 36 of the standards support a rock shaft 38. An angular bracket 40 having one arm split is clamped to the rock shaft in angularly adjusted position by a clamping screw 42. The bracket has an opening receiving a wheel carrying bar or arm 44, a key 46 on the bracket entering a long keyway 48 in the arm to hold the latter from turning. The arm can be clamped in longitudinally adjusted position, according to the size of the work, by a hand screw 50, such adjustment being accompanied, when desired, by a suitable angular adjustment of the bracket 40. A fork 52 is removably secured to the end of the arm 44 by a taper pin and carries the pressure idler wheel 6 which is preferably composed of two spaced rolls journalled on a shaft 54 for independent rotation, the peripheries of the rolls being crowned.

The shaft 38 is rocked by a lever arm 56 which is secured to the shaft by a key 58 and a taper pin 60. The arm 56 has an opening for a stud 62 carrying a socket plate 64, the stud being secured to the arm by a washer 66 and nut 68. A complementary socket plate 70 is secured to the socket plate 64 by screw bolts, a portion of the plate 70 being cut away at one side as indicated at 72. A ball 74 is rockable in the socket and is carried by a toggle arm 76 which is forked and pivoted at 78 to a toggle lever composed of arms 80 and 82. The arm 80 is pivoted at 84 between lugs on a plunger 86 having a stem 88. The plunger is guided vertically in a socket formed in a lug 90 of the casting 12 and is vertically slotted to receive a pin 92 which holds it from rotation. The stem is guided by a bushing 94 and has its lower end necked down to receive a two-part stop collar 96. Between the plunger 86 and a shoulder 98 in the socket is interposed a coil spring 100. When the toggle arms 76 and 80 are in alignment, an extension 101 of the arm 80 engages one side of the arm 76 and provides a shoulder or stop to prevent breaking of the alignment in one direction. The coil spring is then under compression, as indicated in Fig. 1, and reacts through the toggle and through the arm 56, rock shaft 38 and arm 44 to press the wheel 6 down against the work-piece W.

The work is thus held between the three wheels with sufficient pressure to maintain a frictional driving engagement with the driven wheel 2 which controls work rotation during the action of the grinding wheel. During grinding, there is a short reciprocation of the entire work head with the table 8 in accordance with common internal grinding practice. This does not affect the toggle mechanism which travels with the work head. However, when the grinding operation is completed, the work head and table retreat from the grinding wheel to a remote position in accordance with the usual practice in order to permit safe removal of the work without interference with the grinding wheel. To facilitate this removal, it is desirable to raise the wheel or roll 6 automatically and this is governed by the amplified relative movement of the work head and table with respect to mechanism supported on the frame 10.

A plate 102 is secured to the frame by suitable fastening means passed through holes 104 into the frame. At one corner, the plate has a lug 106 with a tapped opening for a stop screw 108 which can be clamped in adjusted position by a clamping member 110. As the work head, table and toggle mechanism reach their remote position (shown in Fig. 3), the arm 82 is carried against the stop screw 108 thereby swinging the toggle lever on the pivot 84 and breaking the toggle. This pulls down on the arm 76 and raises the wheel 6, the coil spring 100 expanding until arrested by the stop collar 96 engaging the bottom of lug 90. When a new piece of work is placed on the wheels, the return of the work head and table to grinding position effects the automatic lowering of the wheel or roller 6. As the toggle mechanism travels to the left in Fig. 3, the arm 82 engages a roller 112 and swings the toggle lever counterclockwise on its pivot 84. This puts the toggle arms in alignment, compresses the spring 100 and lowers the wheel 6. The roller 112 is rotatably mounted by a screw stud 114 on a bracket 116 which is adjustably secured in a channel of the plate 102 by a clamping bolt 118. The breaking of the toggle or its subsequent alignment do not transmit any substantial vertical force between frame and work head such as would tend to tip the table on its ways. When the toggle arms become locked in substantially dead-center alignment, with the stop shoulder 101 against the arm 76, the lever arm 82 becomes sufficiently tilted to ride freely over the roller 112 but is still below the level of the stop screw 108.

The base 29 is swivelled on a trunnion 120 and clamped in adjusted position by bolts 122. The pan has a pair of tapped lugs 124 at the rear, each lug supporting an adjusting screw 126 which engages the base. This construction is to provide for accurately lining up the axis of the backing wheel 2 parallel to the axis of the grinding wheel G and the supporting idler wheel 4 and compensates for any inaccuracies in machining.

I claim:

1. In a grinding machine, a grinding wheel, a work-head, a sliding carriage for one of said members, a frame supporting the carriage, a movable work-holding member on the work-head, and mechanism operated by the movement of the carriage for moving the work-holding member into and out of operative position, said mechanism being constructed and arranged to transmit forces between the carriage and the frame substantially in the direction of sliding of the carriage; substantially as described.

2. In a grinding machine, a grinding wheel, a work-head, a sliding carriage for one of said members, a movable work-holding member on the work-head, and toggle mechanism operated by the movement of the carriage for moving the work-holding member into and out of operative position; substantially as described.

3. In a grinding machine, a grinding wheel, a work-head, a sliding carriage for one of said members, a movable work-holding member on the work-head, mechanism for moving the work-holding member into and out of operative position, said mechanism comprising a toggle carried by the work-head, and means on the frame to operate said toggle; substantially as described.

4. In a grinding machine, a grinding wheel, a work-head, a sliding carriage for one of said members, a movable work-holding member on the work-head, mechanism for moving the work-holding member into and out of operative position, said mechanism comprising a toggle carried by the work-head, a stop carried by the frame for operating the toggle in one direction, and a roller carried by the frame for operating the toggle in another direction; substantially as described.

5. In a grinding machine, a grinding wheel, a work-head, a sliding carriage for one of said members, a movable work-holding member on the work-head, toggle mechanism comprising pivotally connected arms arranged to move into or out of alignment for moving the work-holding member into and out of operative position, and a spring acting on the toggle for pressing the work-holding member against the work; substantially as described.

6. In a grinding machine, a grinding wheel, a work-head, a sliding carriage for one of said members, a frame supporting the carriage, work engaging wheels on the work-head, one of the wheels being bodily movable, and mechanism for moving the wheel comprising a swingable arm pivotally carried by the work-head and a member carried by the frame in the path of said arm; substantially as described.

7. In a grinding machine, a grinding wheel, a work-head, a sliding carriage for one of said members, work engaging wheels on the work-head, one of the wheels being bodily movable, and mechanism for moving the wheel comprising a swingable arm pivotally carried by the work-head, a spring pressed plunger having a pivot for said arm, and means for swinging the arm for compressing the spring; substantially as described.

8. In an internal grinding machine, a grinding wheel, a backing wheel, means engaging and urging a work-piece against the backing wheel, a swivelling support for the backing wheel, and adjusting means for turning the support to locate the axis of the backing wheel parallel to the axis of the grinding wheel; substantially as described.

9. In a grinding machine, a grinding wheel, a work-head, a sliding carriage for one of said members, a movable work-holding member on the work-head, mechanism for moving the work-holding member into and out of operative position, said mechanism comprising pivotally connected arms movable into and out of locking alignment, and an extension on one arm to engage the other in the aligned position; substantially as described.

10. In a grinding machine, a grinding wheel, a work-head, a sliding carriage for one of said members, a movable work-holding member on the work-head, mechanism for moving the work-holding member into and out of operative position, said mechanism comprising pivotally connected arms movable into and out of locking alignment, a third arm projecting from one of the other arms, and a stop in the path of the third arm; substantially as described.

11. In a grinding machine, a grinding wheel, a work-head, a sliding carriage for one of said members, a movable work-holding member on the work-head, mechanism for moving the work-holding member into and out of operative position, said mechanism comprising pivotally connected arms movable into and out of locking alignment, a spring pressed pivot for one of said arms, a third arm projecting from said one arm, and a member engageable with the third arm to effect alignment of the pivotally connected arms and to compress the spring; substantially as described.

12. In a grinding machine, a grinding wheel, a work-head, a sliding carriage for one of said members, a movable work-holding member on the work-head, mechanism for moving the work-holding member into and out of operative position, said mechanism comprising pivotally connected arms, means for effecting movement of said arms into and out of locking alignment, and a universal connection between one of said arms and the movable work-holding member; substantially as described.

In testimony whereof I hereunto affix my signature.

PHILIP H. HUTCHINSON.